Dec. 20, 1966   E. BEHR ET AL   3,292,539
SMALL SHOT CARTRIDGE CASE
Filed July 6, 1964
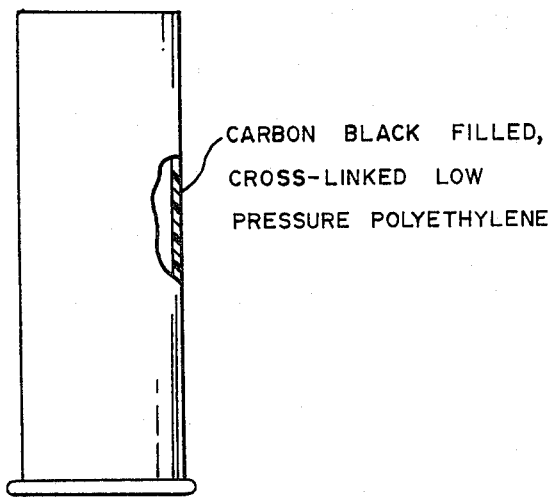
CARBON BLACK FILLED, CROSS-LINKED LOW PRESSURE POLYETHYLENE
INVENTORS
Erich Behr
Thomas Schinnerer
BY
Dicke & Craig
ATTORNEYS 3,292,539
SMALL SHOT CARTRIDGE CASE
Erich Behr, Troisdorf, and Thomas Schinnerer, Furth, Bavaria, Germany, assignors to Dynamit Nobel Aktiengesellschaft, Troisdorf, Germany
Filed July 6, 1964, Ser. No. 380,614
Claims priority, application Germany, July 9, 1963, D 41,939
3 Claims. (Cl. 102—43)

The manufacture of cartridge cases for training ammunition from thermoplastic synthetic materials is a well-known and frequently employed measure. In view of the favorable experience had with these types of plastic cases, thermoplastic materials, such as polyethylene, polypropylene, polyvinyl chloride, and polyamides, have been used also in the manufacture of small shot cartridge cases. However, it has been found that these plastics do not satisfy the high requirements needed with this type of ammunition. In other words, the rigidity properties of the cartridge cases corresponding to the high standards required in small shot cartridge cases cannot be achieved with the thermoplastic materials previously employed.

As is well known, a small shot cartridge must be usable at temperatures of from about −20° to about +50° C., i.e., its faultless operation within this temperature range must be absolutely guaranteed. When a plastic case is used for the cartridge, this means that the plastic must not become brittle at the low temperatures and should not lose its firmness and form stability at the high temperatures. Moreover, the plastic material must not absorb any water. At least, the plastic case should not swell. Additionally, the plastic in such cases must be chemically inert to the powder charge or charges in the cartridge.

The drawing shows one piece plastics cartridge case which is partly in section to show the specific plastics composition of the invention.

If the cartridge case, i.e., the shaft of the case and the base thereof, are made together of one piece, which is advisable because of the considerable savings in material and working expenditures that can be attained thereby, the plastic material that is used must be so rigid in its formed shape and much have such notch-strength that the operation of the loader, feed mechanism and ejector of the weapon from which the cartridge is fired is flawless with absolute certainty within the temperature range indicated above. When small shot cartridges are fired from semi-automatic weapons, the strength of the plastic must be great enough that the cartridge cases will be able to withstand ejection from these weapons without impairing their functioning by deformation or breakage.

From among the plastics previously employed for small shot cartridge cases, polyethylene seems to have most nearly met the above-specified requirements. But even with this material, the manufacture of a one-piece small shot cartridge case consisting of shaft and base and corresponding to the practical requirements needed with regard to strength and ridigity could not be achieved. Therefore, small shot cartridge cases have been made consisting of a case shaft made from a tough, solid, primarily crystalline polyethylene having a density of at least 0.94 after tempering and consisting of at least 90% of ethylene, whereby the polymer has a 2-dimensionally-oriented molecular structure which is stable up to temperatures of 65.6° C., the case shaft being used in conjunction with a metallic base or bottom piece. Although such a small shot cartridge case with a shaft made from biaxially stretched polyethylene assures a satisfactory firing behavior within the temperature range of from −20° to +50° C., this material is not entirely satisfactory because the manufacture of a biaxially stretched polyethylene tube meeting and satisfying all the requirements is difficult. Moreover, the two-partite construction of the case as well as the subsequent connection or combination of the two case parts with one another requires a relatively high expenditure with regard to material and labor.

It is the object of the present invention to provide a small shot cartridge case from plastic material which not only affords the assurance of a faultless firing behavior within the required temperature range, but which may also be manufactured simply and inexpensively in a weight-saving manner as well as in a single working step or operation in one piece, thus reducing the high expenditure of material and labor previously required.

In accordance with the present invention, a small shot cartridge case is thus provided which is characterized by being manufactured in a single working step in one piece and consisting of cross-linked polyethylene, preferably carbon black-filled low-pressure polyethylene. It has surprisingly been found that this known material, which may be processed or treated in a simple manner according to conventional flow-molding techniques possesses to a high degree all the properties essential for use in small shot cartridge cases.

The low-pressure polyethylene that is used in producing the small shot cartridge cases of the present invention is well known in the art. This type of polyethylene has a density of about 0.94 to 0.96 and a molecular weight in excess of 50,000. Low-pressure polyethylene can be made by polymerizing ethylene at low pressures, e.g., about 100 to 200 pounds per square inch.

The low-pressure polyethylene is cross-linked by the addition of a suitable cross-linking agent. Organic peroxides are quite suitable for this purpose, especially those that decompose into oxy-radicals at high temperature. Peroxides containing an oxygen bonded to a tertiary carbon atom are particularly useful. The preferred cross-linking agent is dicumyl peroxide. Other cross-linking agents include, by way of example, di-t-butyl peroxide, di-t-amyl peroxide, 2,5-dimethyl-2′,5′-di-t-butylperoxy hexane, 2,5-dimethyl-2′,5′-di-t-butylperoxy hexyne, bis(α-t-butyl-p-isopropylbenzyl) peroxide, and bis(α-t-butyl-m-isopropylbenzyl) peroxide.

The carbon black used as a filler in the compositions of the present invention can be any of those well known in the art for such purposes. For example, the commercial carbon blacks prepared by the incomplete combustion of hydrocarbon gases or liquids may be used. Some of the carbon blacks that may be used satisfactorily include GPF (general purpose furnace), HAF (high abrasive furnace), SRF (semi-reinforcing channel), and HPC (hard processing channel) carbon blacks. Carbon blacks having a grain size of between 100 and 1,000 A., particularly 200 to 400 A., have been found most satisfactory in providing high mechanical resistance, such as good tensile strength and resistance against shock, in the small shot cartridge cases. In order to obtain good cross-linking of the polyethylene, very pure carbon black, for example, 98% carbon and above, is preferred. Furnace carbon blacks, such as GPF black, having a pure carbon content of 95% and above, small proportions of volatile constituents, and a pH of more than 6 are especially preferred.

The amount of cross-linking agent used in making the cross-linked polyethylene small shot cartridge cases may be varied widely depending on the type of polyethylene used, the ratio of polyethylene to carbon black, and the cross-linking effectiveness of the peroxide. Generally, an amount of peroxide of from about 1 to 6%, based on the weight of the mixture, is effective. Preferably, an amount of peroxide of from 2 to 5%, based on the weight of the mixture, is used. The amount of carbon black may vary from about 10 to 50%, based on the weight of the mixture, depending on the results desired. Preferably, an amount of 20 to 40% by weight of carbon black is used. The optimum amounts of the various constituents forming the mixtures from which the small shot cartridge cases of the present invention are made depend upon the particular ingredients used, the time and temperature of treatment, and the degree of cure desired in the polymer.

Admixture of the components can be effected by any of the conventional methods, for example, working on a roller mill, in a Banbury mixer, in a kneader, etc. Preferably, the polyethylene is added first, then the carbon black, and the cross-linking agent last. The polyethylene and carbon black are admixed at temperatures above the softening point of the polyethylene. After a thorough blending thereof, the peroxide is worked in at temperatures of, for example, 110 to 130° C. The mixing of the components may be accomplished over a wide range of temperatures but care should be exercised in preventing scorching. In general, blending is carried out at a temperature just below the activation temperature of the peroxide or cross-linking agent used.

After the mixture has become homogeneous, the composition is molded in a conventional manner to give the desired small shot cartridge case in one piece and in one working operation. The temperature at which the molding operation is effected can vary, but, usually, the molds are pre-heated and the molding operation is carried out at around 180° C. Molding pressures, of from about 500 to 1500 kg./cm.² are suitable. Curing of the composition can be accomplished at ordinary pressures or at super-atmospheric pressures, such as from 10 to 1,000 pounds per square inch or more in the mold or press used to make the cartridge cases. Generally, the cure takes place at temperatures of between 150 and 200° C. The curing time is dependent upon the wall thickness of the cartridge cases and varies from 30 to 60 seconds per millimeter of wall thickness.

The following example is given by way of illustration and is not to be considered as limiting.

EXAMPLE

A mixture containing 65% by weight of low-pressure polyethylene ($n_{red}$=2.5 and $i_5$=1.5) and 35% by weight of carbon black (GPF quality) was worked on heated rollers until it became homogeneous. Dicumyl peroxide in an amount of 3% by weight of the mixture was added and worked in at about 120° C. Small shot cartridge cases were molded in one piece and in one working operation from the homogeneous batch at 180° C. in a flow-molding press. The resultant small shot cartridge cases showed no errors whatsoever during firing tests at −20° C., nor were any longitudinal cracks or breaking of the case base noted. Even at +60° C., the errors usually observed with cartridge cases made from polyethylene did not occur.

While the invention has been described with reference to certain specific embodiments thereof, it is obvious that there may be many variations which fall within the true scope and spirit of the invention. Accordingly, the invention should be limited in scope only as outlined in the appended claims.

We claim:
1. A shot cartridge comprising a case shaft and a base of a carbon black filled cross-linked low pressure polyethylene both formed as one homogeneous part consisting essentially of:
   55–75 percent by weight of low pressure polyethylene with a $n_{red}$ between 2 and 3 and $i_5$-value of 1–2,
   45–25 percent by weight of carbon black and
   2–5 percent by weight relative to the total mixture of an organic peroxide cross linking agent.
2. A shot cartridge comprising a case shaft and a base, of a carbon black filled, cross linked low pressure polyethylene both formed as one homogeneous part, consisting essentially of:
   40–90 percent by weight of low pressure polyethylene with a $n_{red}$ between 2 and 3 and $i_5$-value of 1–2,
   10–50 percent by weight of carbon black and
   1–6 percent by weight relative to the total mixture, of an organic cross linking agent.
3. A shot cartridge comprising a case shaft and a base of a carbon black filled, cross linked low pressure polyethylene both formed as one homogeneous part consisting essentially of:
   40–90 percent by weight of low pressure polyethylene with a $n_{red}$ between 2 and 3 and $i_5$-value of 1–2,
   20–40 percent by weight of carbon black and
   1–6 percent by weight relative to the total mixture of an organic cross linking agent.

References Cited by the Examiner

UNITED STATES PATENTS

| | | | |
|---|---|---|---|
| 2,825,721 | 3/1958 | Hogan et al. | 102—43 |
| 2,953,990 | 9/1960 | Miller | 102—42 |

OTHER REFERENCES

Polythene, second edition, edited by A. Renfrew and P. Morgan, Interscience Pub. Inc., New York, January 4, 1961, pp. 65, 321, and 426 required.

The Condensed Chemical Dictionary, edited by A. Rose and E. Rose, Reinhold Pub. Corp., New York, April 4, 1957, p. 879 (required).

SAMUEL FEINBERG, *Primary Examiner.*

BENJAMIN A. BORCHELT, *Examiner.*

R. F. STAHL, *Assistant Examiner.*